June 18, 1957  G. H. CONNORS  2,796,159
BRAKE AND CLUTCH ADJUSTING MECHANISM
Filed Sept. 16, 1953  2 Sheets-Sheet 1

INVENTOR.
George H. Connors
BY Robb & Robb
attorneys

United States Patent Office 2,796,159
Patented June 18, 1957

2,796,159

BRAKE AND CLUTCH ADJUSTING MECHANISM

George H. Connors, Edgerton, Wis., assignor to Highway Trailer Company, Edgerton, Wis., a corporation Application September 16, 1953, Serial No. 380,570

1 Claim. (Cl. 192—18)

This invention relates to brake and clutch adjusting mechanism and primarily to such mechanism where alternate applications of brake and clutch instrumentalities are resorted to for controlling the operating of a machine with which the same are associated.

Where brake and clutch mechanism of the above class is availed of, many times the construction of the transmission unit with which the same is used or in which the same are incorporated, makes desirable the adoption of adjusting means which will require only limited space and yet be effective and simple to manipulate.

The present invention is particularly suitable for use in power transmission where the brake and clutch instrumentalities are axially aligned, each comprising a series of interleaved plates or discs which are compelled by shifting means intermediate the respective units, to move into brake or clutch contacting positions.

The clutch and brake mechanisms of this invention are desirably operable upon limited movement of the respective discs or plates and this requires that some means be provided to maintain such limited movement effective for such operation. This is accomplished by providing an axially adjustable member intermediate the units which will be accessible and yet simple to manipulate for adjusting purposes and stay in adjustment thereafter.

It is therefore a principal object of this invention to provide in brake and clutch mechanism of the class described, adjustable means intermediate clutch and brake instrumentalities which may be simply constructed and accessible to compensate for wear of the brake and clutch parts.

A further object of the invention is to provide adjusting means which may be mounted on at least one of the brake or clutch instrumentalities, and is axially movable for varying the distance required to effect brake and clutch application.

A still further object of the invention is to provide adjusting means which comprises a threaded ring mounted on one of the clutch or brake instrumentalities and is movable so as to compensate for wear and enable the distance of movement by the shifting means to be maintained at a substantially constant value, there being provided a device for maintaining the ring in the various positions to which it is adjusted.

Other and further objects of the invention will be understood from a consideration of the appended specification and set forth in the drawings wherein.

Figure 1:
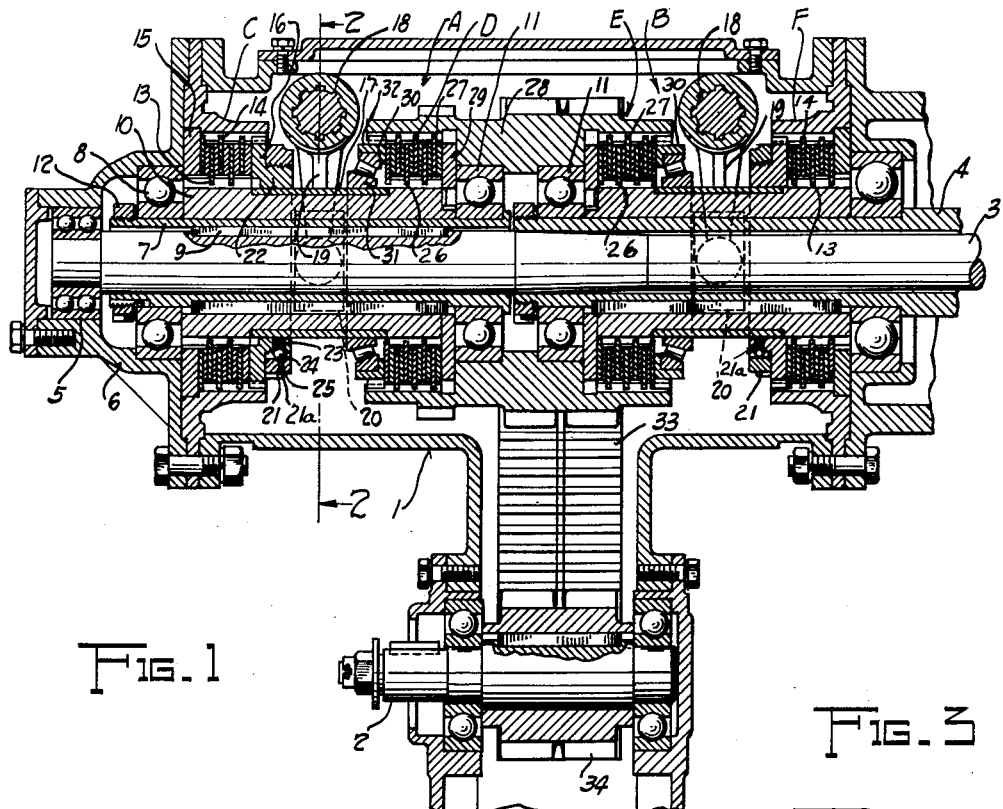
Figure 1 is a sectional view of a transmission in which the brake and clutch adjusting means or mechanism is incorporated, showing the relationship between the clutch and brake instrumentalities and the drive therefore.
Figures 4, 5:
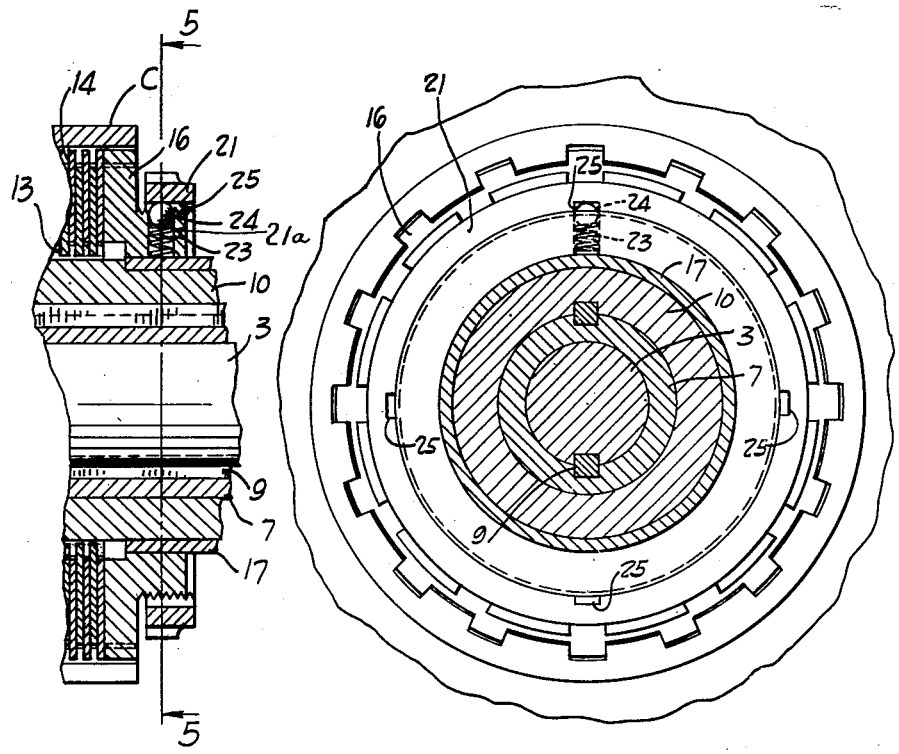
Figure 4 is a fragmentary sectional view somewhat enlarged showing the adjusting means of the invention in one of the positions to which it may be moved.
Figure 5 is a sectional view, somewhat fragmentary in nature taken about on the line 5—5 of Figure 4 looking in the direction of the arrows.

Referring now primarily to Figures 1 and 4 a suitable power transmission in which the brake and clutch adjusting means of this invention may be incorporated is disclosed, as comprising a main casing 1, at the lower portion of which is a reduced section in which is mounted a power input shaft designated 2.

Power is directed from the transmission to a solid output shaft designated 3 at the upper portion of Figure 1, said shaft extending through the housing and to a suitable point therebeyond, the shaft being mounted within a hollow output shaft designated 4.

Generally surrounding the solid output shaft 3, there are shown a pair of brake and clutch units designated A and B respectively, said units being substantially identical as to construction but being of the opposite hand.

Since the units are substantially identical for all practical purposes herein, like reference characters applied to the unit A will also find their counter-parts in the unit of B.

Turning therefore to a consideration of the brake and clutch unit designated A, it will be seen that the solid output shaft is mounted at its left hand end in a suitable thrust bearing generally designated 5, which thrust bearing is in turn supported in a bearing housing 6, the bearing housing 6 being in turn fastened at the left hand end of the main casing 1.

The shaft 3 in turn supports thereon a sleeve 7 mounted in a suitable bearing 8, the sleeve 7 being keyed as by a key 9 to the shaft 3. Suitably pressed on the sleeve 7 is a further sleeve designated 10, which sleeve is mounted between the bearing 8 and an additional bearing 11, and fixed so as to rotate the inner section of the bearing by means of a nut 12 threadedly engaged with the sleeve 7 mentioned.

Figure 2:
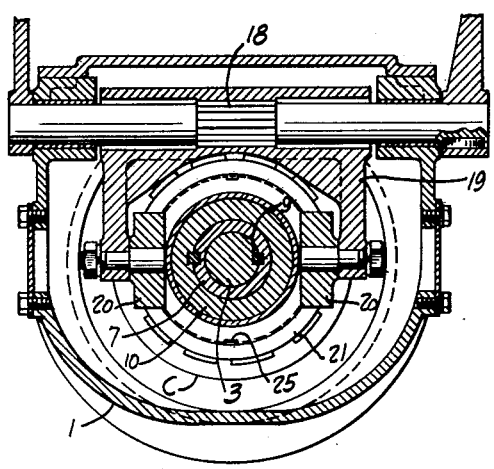
Figure 2 is a vertical sectional view taken approximately on the line 2—2 of Figure 1 looking in the direction of the arrows.

Spaced around the periphery of the sleeve 10, the same is provided with suitable splines which carry the interleaved discs 13 having co-mating splined sections, the said discs 13 being part of the brake instrumentalities designated C. Other discs 14 are in turn engaged with the interior splined portion of a non-rotatable member 14, which is fastened at its periphery to the end of the casing 1 and between the housing 6 and the casing. A suitable backing plate 15, of annular configuration may be provided, mounted at the left end of the unit C, and a pressure plate 16 spaced from the plate 15 is also provided and of the type which is mounted so as to be movable along the sleeve 10, there being a suitable bearing 17 provided therefor. It will be understood therefore that by means of a suitable shifting mechanism which includes a transverse shaft 18, and a yoke 19 fastened thereto, the yoke 19 being in turn provided with suitably mounted shoes 20 as shown in Figure 2, whereby rotation of the shaft 18 for example in a clockwise direction, will cause the shoes 20 to engage at least indirectly with the pressure plate 16, and more directly in a manner now to be set forth.

Suitably mounted on the pressure plate 16, and provided for adjusting the shifting instrumentalities as will be explained also, is an adjusting ring generally designated 21, which is threadedly engaged with the portion 22 of the pressure plate 16. It will be understood that by rotating the ring 21 so as to move from right to left as viewed in Figure 1, the said ring may be positioned with respect to the pressure plate as will be obvious. As shown in Figure 5, the ring 21 is equipped at its periphery with a series of notches whereby rotative adjustment is facilitated, and at its inner periphery the ring 21 is also equipped with grooves extending longitudinally of the ring through the threads. A positioning device designated 21a is provided, the same comprising a small spring 23 and a suitable ball bearing 24 pressed by the spring 23 into engagement with the notches 25 at the inner periphery of the ring 21.

Turning now to a description of the clutch instrumentalities of the mechanism, it will be noted that the same are generally designated D, and include a series of spaced plates 26, splined at their inner peripheries so as to engage co-mating splined portions of the sleeve 10 and thus be rotatable therewith. Interleaved plates or discs 27 are provided, these being splined at their peripheries so as to interengage with co-mating splines of a drive member generally designated 28. A suitable bearing or backing member 29 is likewise provided for the series of discs 26 and 27, and spaced therefrom and inwardly thereof so to speak, is a thrust bearing designated 30. The thrust bearing 30 includes a race member 31, and what may be termed a pressure plate 32, is engaged with the outer race member of the bearing 30. In view of the foregoing it will be seen that as shown in the figure the shoes 20 of the shifting yoke 19 are mounted between the ring 21 and the baring 30, there being provided suitable clearance whereby manipulation of the shaft 18 of the shifting device will compel movement of the shoes 20 to the left or right as viewed in Figure 1, and likewise cause engagement of the brake instrumentalities C or correspondingly the clutch instrumentalities D depending upon the manner in which the shaft 18 of the shifting device is manipulated.

It will be seen that the drive member 28 is supported on the bearing 11 previously mentioned and the corresponding additional bearing 11 of the other brake and clutch unit B. The drive member 28 is intended to be furnished with a suitable peripherally formed sprocket section which engages a suitable chain 33, the chain 33 being in turn engaged with a corresponding sprocket member 34 suitably mounted on the input shaft 2. Thus rotation of the input shaft 2 will obviously compel movement of the drive member 28, and in turn the plates 27 splined thereto. When the shifting yoke 19 is moved so that the shoes 20 engage the thrust bearings 30, the plates 27 and 26 will become frictionally engaged, and thus carry the drive from the drive member 28 to the shaft 3. Correspondingly when the shifting yoke 19 is moved in the opposite direction, it will cause the plates 13 and 14 to become frictionally engaged, and acting as a brake, to cause the shaft 3 to be stopped in its rotative movement.

As has been previously generally explained, the clutch and brake unit B is formed of parts of substantially identical configuration to those previously described, and thus will not be further referred to other than to state that a similar manipulation of the adjusting or the shifting yoke 19 thereof, will compel braking and clutching action to be imparted to the clutch unit designated E or the brake unit designated F in the same manner in which the respective instrumentalities C and D of the brake and clutch mechanism A. In this particular instance however the drive will be carried to the hollow output shaft 4 for example or a braking effect by the instrumentalities F will be likewise imparted to such shaft.

Figure 3:
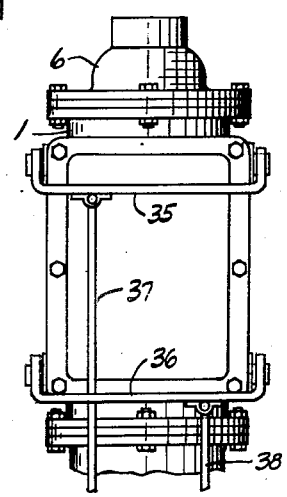
Figure 3 is a top plan view showing the exterior of the transmission and one means for controlling the respective brake and clutch instrumentalities therein.

As shown in Figure 3 suitable control yokes 35 and 36 may be provided, connected to control rods 37 and 38 respectively, whereby manipulation or motion may be imparted to the shifting yokes of the brake and clutch units A and B in accordance with any desired manipulations thereof.

In view of the fact that the transmission of this disclosure is one in which axially aligned brake and clutch instrumentalities are provided, it will be apparent that simple adjusting instrumentalities are desirable, in view of the fact that the respective clutch and brake instrumentalities having the respective interleaved discs or plates therein, eventually are worn somewhat. It is therefore desirable to maintain proper sensitivity of action, and thus the brake and clutch adjusting mechanism of this invention, which comprises the ring 21 and its association in the manner described with the brake instrumentalities C is provided. It should be apparent that when the ring 21 is moved into the position for example of the disclosure in Figure 4, that wear which may have accumulated between the respective plates 13 and 14 or plates 26 and 27 may be compensated for so as to reduce the amount of movement required by the shifting yoke 19 carrying out its shifting function. Heretofore no such provision has been made in a clutch and brake mechanism of this type, previously having been necessary to replace the clutch and brake discs or plates when they became worn.

It will also be understood that by reason of the provision of the peripheral notches on the ring 21, simple adjustment may be attained by rotating the ring 21 with respect to the pressure plate 22 so as to compensate for such wear. Thus the relative spacing between the instrumentalities C and D may be maintained, and the positioning device 21a is suitable for maintaining the ring in its various adjusted positions. The spacing between the parts 31 and 21 of the instrumentalities E and F may be varied in the same manner and the clutch and brake unit B will thus be suitably maintained in its best operating condition.

It should also be understood that the adjusting mechanism herein described may very suitably be incorporated into the clutch instrumentalities D or E or in both the brake and clutch instrumentalities C, D, E, and F as conditions require.

I claim:

In brake and clutch mechanism of the class described, in combination, brake and clutch instrumentalities each comprising a series of interleaved rotatable and stationary plates, engageable for clutch and brake operation, said instrumentalities being in substantial axial alignment, means for shifting said plates into engaged and disengaged positions, and a single means for regulating the amount of movement required by said plates to each of their respective positions, said means comprising an axially movable ring intermediate said clutch and brake instrumentalities, said ring having threaded engagement with one of said instrumentalities and a positioning device arranged within the ring comprising a radially formed socket, a spring seated in said socket, a ball engaged with said spring and pressed outwardly thereby, said ring being provided with a series of notches in the threaded portion thereof, said ball being adapted to engage any one of said notches and maintain said ring in various adjusted positions.

References Cited in the file of this patent

UNITED STATES PATENTS

| 1,988,748 | Pearman | Jan. 22, 1935 |
| 2,140,619 | Dunkelow | Dec. 20, 1938 |
| 2,185,714 | Scherer | Jan. 2, 1940 |
| 2,205,989 | Meyers et al. | June 25, 1940 |
| 2,279,700 | Adamson | Apr. 14, 1942 |
| 2,376,799 | Miller | May 12, 1945 |
| 2,397,414 | Fast | Mar. 26, 1946 |
| 2,418,019 | Fast | Mar. 25, 1947 |
| 2,519,026 | Cuttat | Aug. 15, 1950 |

FOREIGN PATENTS

| 553,451 | Great Britain | May 21, 1943 |